(No Model.)
W. C. PARSONS
FIFTH WHEEL.
No. 592,712. Patented Oct. 26, 1897.
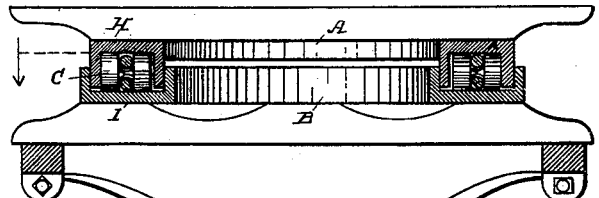
Fig. 1.
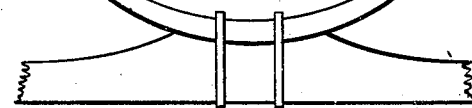
Fig. 2.
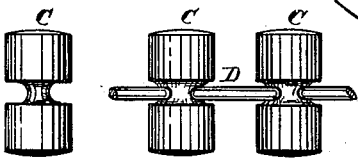
Fig. 3. Fig. 4.
Fig. 5.
Fig. 6.
Fig. 7.
Fig. 8.
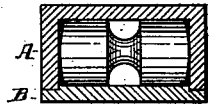
Fig. 10.
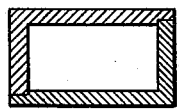
Fig. 11.
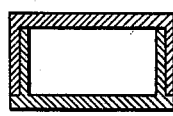
Fig. 12.
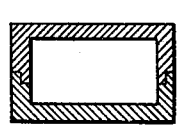
Fig. 13.
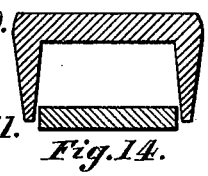
Fig. 14.
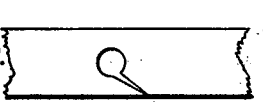
Fig. 9.
Witnesses:
W. F. Fouse
John H. Thomas
Inventor:
William C. Parsons:
by Humphrey & Humphrey
Attys.

UNITED STATES PATENT OFFICE.

WILLIAM C. PARSONS, OF AKRON, OHIO, ASSIGNOR TO THE SELLE GEAR COMPANY, OF SAME PLACE.

FIFTH-WHEEL.

SPECIFICATION forming part of Letters Patent No. 592,712, dated October 26, 1897.

Application filed December 21, 1896. Serial No. 616,466. (No model.)

*To all whom it may concern:*

Be it known that I, WILLIAM C. PARSONS, a citizen of the United States, residing at Akron, in the county of Summit and State of Ohio, have invented a certain new and useful Improvement in Fifth-Wheels for Vehicles, of which the following is a specification.

My invention has relation to improvements in roller fifth-wheels for wagons, drays, carriages, and kindred purposes; and it has for its object the production of improved devices whereby the friction of these parts may be reduced to a minimum and consequent wear avoided, the construction of the parts simplified, and the parts be susceptible of rapid removal and replacement when necessary.

It further consists in devices for maintaining the rollers at determinate intervals, so as to distribute the load equally upon the wheel.

To the aforesaid objects my invention consists in the peculiar and novel construction, arrangement, and combination of parts hereinafter described, and then specifically pointed out in the claims, reference being had to the accompanying drawings, forming a part of this specification.

In the accompanying drawings, in which similar reference-letters indicate like parts in the different views, Figure 1 is an end elevation of a portion of a wagon-gearing provided with my improved fifth-wheel; Fig. 2, a plan of my improved fifth-wheel detached with a part of the upper circle broken away to show the friction-rollers; Fig. 3, a single roller to show its construction; Fig. 4, two rollers united by one form of coupling; Figs. 5, 6, 7, 8, and 9, different modifications of the flexible coupling; Figs. 10, 11, 12, 13, and 14, cross-sectional views of different modifications of the annular beds or circles of the fifth-wheel.

Referring to the drawings, A is the upper member, and B the under member, of the fifth-wheel, and the two constitute a circle having an internal annular substantially rectangular space forming a track for the friction-rollers to run in.

Each friction-roller C is in form a short solid metallic cylinder, with a reduced central portion, producing in effect two short cylinders united by a neck, the corners of union between the cylinders and neck being preferably rounded, the outer ends of the roller being slightly convex and their faces slightly crowning. The reduced portion or neck is for the purpose of uniting them, and for this purpose I use a wire or wires, as hereinafter shown, the convex ends being for the purpose of reducing the rubbing-surface between them and the outer face of the annular channel in which they run and the crowning form of the ends to cause them to tend to the center of the track and wear the track and themselves more equally and evenly. It is essential to effectual service that these rollers should be separated at determinate distances, and it is also desirable that their union should be measurably flexible. To accomplish this, I find a preferred construction to be that shown in Figs. 4 and 5, which consists in a wire D, bent at determined intervals into half-loops of sufficient size at the largest part to encircle the neck of the roller C and slightly narrower toward the part from which it is turned, so that the wire must be slightly sprung to permit of its insertion and to retain it normally until released by repeating the operation. If preferred, however, two wires E F may be employed, each bent into a half-loop, the two halves serving to encircle the neck of the roller and their intermediate parts bound together with metallic straps G, (see Fig. 6,) or the intermediate parts of the wires may be twisted together, as illustrated in Fig. 7, or one of the wires only may be bent and the other straight and the two bound with straps, as illustrated in Fig. 8, or it may be a flattened bar J, Fig. 9, having holes for the neck of the roller and a diagonal cut extending from one edge into it to permit the introduction of the neck, these different modifications being regarded by me as equivalent and not claimed as separate distinct devices.

The construction of the circles to form the annular track for the rollers may also be modified without departing from my invention, six forms of which I have illustrated in the drawings—the first shown in Fig. 1, where both circles are channeled and the upper, H, fits into the lower, I; a second in Fig. 10, where the upper circle only is channeled, and its edges rest on rabbeted grooves in the edge of the lower circle; a third, Fig. 11, in which each circle has one flange and the flange of each rests on a rabbeted groove in the other; a fourth, Fig. 12, the reverse of that shown in Fig. 1, where the lower circle fits in the groove in the upper circle; a fifth, Fig. 13, where each circle has flanges extending half the distance between them, the edges of adjacent flanged edges being rabbeted to match into each other, and a sixth, Fig. 14, where the lower circle is a flat plate and the upper channeled to fit over the lower and its edges preferably tapering, thus tapering the opening from the open part inward and having its corners slightly rounded. It will thus be seen that the rollers will always be maintained at determinate intervals. Their end configuration will reduce the friction with the sides of the hollow track, while their crowning shape will constantly tend to keep them in the center of the track. It is in contemplation to have these manufactured in long pieces or strings, and when it is desired to use them a sufficient length can be cut off and the ends joined.

A marked advantage is secured by this construction over devices where free balls or rollers are used in the fact that the parts are not only held equidistant from each other, but in placing and removing them the string of rollers can be moved and handled as a single piece.

When extreme exactness is needed, as may occur, the inner half of each roller may be made of slightly less diameter than the outer, thus making the outline of the two rollers united the frustum of a cone, and in such case the configuration of the interiors of the upper and lower circles will be correspondingly changed.

I claim as my invention—

1. An improved fifth-wheel consisting of upper and lower circles adapted to interlock and constitute together an annular hollow track; in combination with a series of rollers adapted to run in said track, each roller having a reduced central portion, and a flexible connection, adapted to encircle said reduced portions of said rollers and retain them at determinate intervals from each other, substantially as shown and described.

2. As an improved article of manufacture an antifriction device adapted to run in a hollow fifth-wheel, consisting of a series of rollers, each having a reduced central portion, and a flexible connection inclosing at intervals the reduced portions of said rollers, substantially as shown and described.

In testimony that I claim the above I hereunto set my hand.

WILLIAM C. PARSONS.

In presence of—
C. P. HUMPHREY,
C. E. HUMPHREY.